July 5, 1938.  H. FORD  2,123,005
MOTOR VEHICLE
Filed May 13, 1937  2 Sheets-Sheet 1

W. E. Witzke

INVENTOR.
Henry Ford
Delwin C. McRae
BY
ATTORNEY.

July 5, 1938.  H. FORD  2,123,005
MOTOR VEHICLE
Filed May 13, 1937  2 Sheets-Sheet 2

INVENTOR.
Henry Ford.
Edwin C. McRae
BY
ATTORNEY.

W. E. Witzke

Patented July 5, 1938

2,123,005

UNITED STATES PATENT OFFICE 2,123,005

MOTOR VEHICLE

Henry Ford, Dearborn, Mich., assignor to Ford Motor Company, Dearborn, Mich., a corporation of Delaware Application May 13, 1937, Serial No. 142,369

7 Claims. (Cl. 180—70)

The object of my invention is to provide a motor vehicle wherein the engine, transmission, differential and axle reduction gearing are all formed as a unit at the rear of the car, so as to more directly transmit the drive from the engine to the driving wheels.

More specifically, my invention relates to the structural details incorporated in the above mentioned assembly and the means whereby exact alignment of the various driving shafts is made unnecessary. In the past, considerable difficulty has been experienced with all driving units of like nature because of the difficulties in maintaining exact alignment between the various units comprising the assembly. It is extremely costly to machine the various parts so that the axis of the engine crankshaft is exactly aligned with the axis of the transmission and driving pinion. In all other assemblies known to the applicant if such an alignment is not maintained, noisy operation invariably results. Furthermore, it is well known that the engine crank shaft bearings are subject to wear and that when the bearing caps are adjusted the axis of the crank shaft is shifted laterally a small amount. Alignment is thereby altered and with all other units known binding occurs between the crankshaft extension and the transmission shaft which causes considerable service problems. The driving pinion in such installations is invariably located adjacent to the driving end of the crank shaft so that when this shaft is offset even a few thousandths of an inch the crank shaft extension binds in the driving pinion.

The object of my invention is, therefore, to provide a means whereby the axis of the crank shaft may be offset laterally an appreciable amount without causing binding between any of the parts associated with the drive.

A further object of my invention is to provide an engine driving unit adapted to be installed transversely in a vehicle frame, which unit will be better balanced laterally than other similar units. It is almost essential that the drive to the axles be transmitted from the center of the frame and, consequently, the engine, when mounted transversely, must be located on one side only of the vehicle. In the past this has caused the car to sag toward the engine side. The applicant has provided a unit wherein the engine flywheel, clutch and other relatively heavy parts are located on one side of the car with the crank shaft and cylinder block on the other side to thus obtain improved lateral balance for the unit.

With these and other objects in view, my invention consists in the arrangement, construction and combination of the various parts of my improved device, as described in this specification, claimed in my claims and illustrated in the accompanying drawings, in which:

Figure 1:
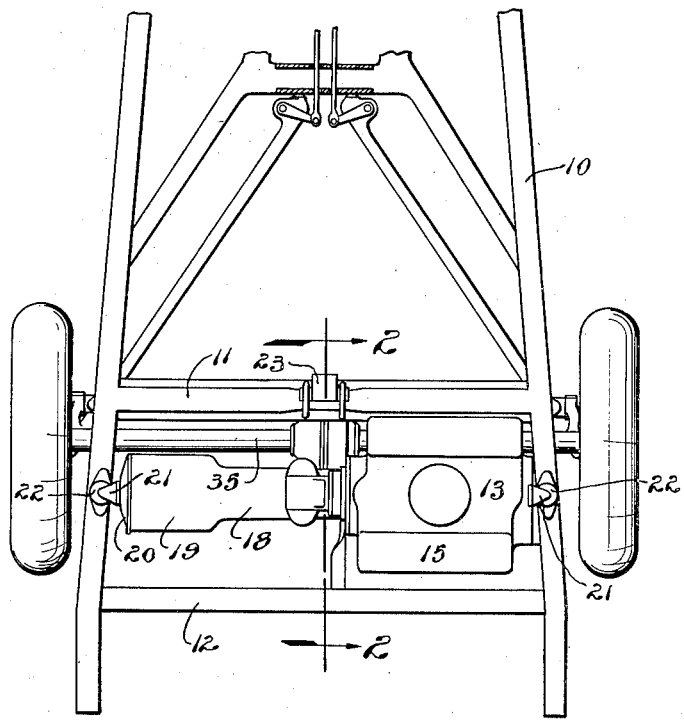
Figure 1 is a plan view of the rear portion of a motor vehicle having my improved driving unit installed thereon.
Figure 2:
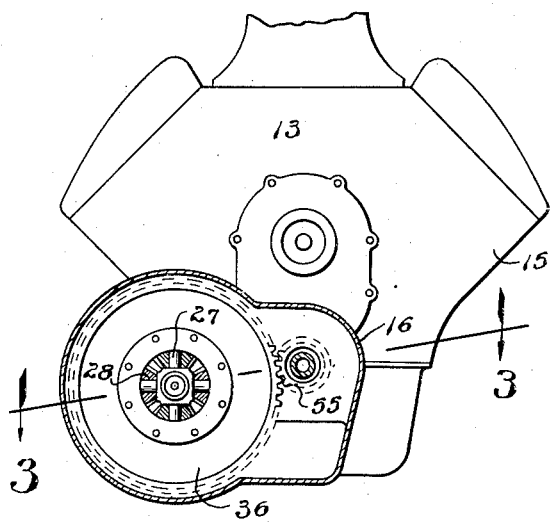
Figure 2 is a sectional view, taken on the line 2—2 of Figure 1.

Referring to the accompanying drawings, I have used the reference numeral 10 to indicate the frame side members of a motor vehicle chassis, which members are provided with a pair of cross members 11 and 12, respectively, both disposed at the rear of the frame. My improved driving unit is adapted to be mounted within the rectangular frame portion formed by these side members and cross members.

My improved driving unit comprises a V-type 8-cylinder internal compustion engine 13 having a crank shaft 14 rotatably mounted therein in the conventional manner. The cylinder block casting of the motor 13 has been given the reference numeral 15, and from the drawings it will be seen that this casting is bolted directly to a housing member 16 which forms one-half of the axle gear and differential housing. The other half of the gear housing is formed by a casting 17 which is cast integrally with a transmission housing 18. The transmission housing is also cast integrally with a flywheel housing 19. The motor 13 forms one end of the driving unit while the flywheel housing forms the other end.

The housings 16 and 17 form a differential and axle gear housing at the center of the car while the transmission housing 18 is interposed between the differential housing and the flywheel housing. A cover 20 forms a closure for the extreme outer end of the housing 19 and a pair of brackets 21 which are secured to the cover 20 and to the outer end of the motor 13, respectively, support the assembly upon a pair of rubber pucks 22 which are fastened to the side members 10. The motor and driving unit is thus supported upon the side members substantially along a line passing through the crank shaft of the motor. A supporting bracket 23 extends from the axle gear housing to the center portion of the cross member 11 where it is secured thereto by means of a rubber support. This support is not shown in detail, as it forms no part of this invention and because it is better illustrated in my previously mentioned patent. It is believed sufficient to say that a three-point suspension is thus provided for the motor and driving unit, above described.

Figure 3:
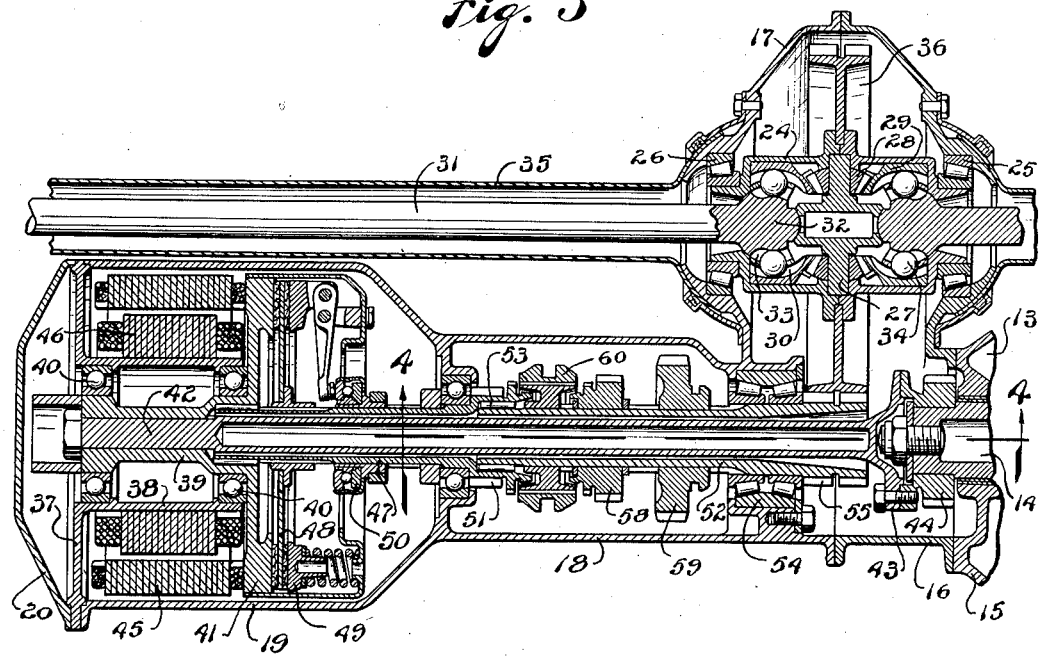
Figure 3 is a sectional view, taken on the line 3—3 of Figure 2.
Figure 4:
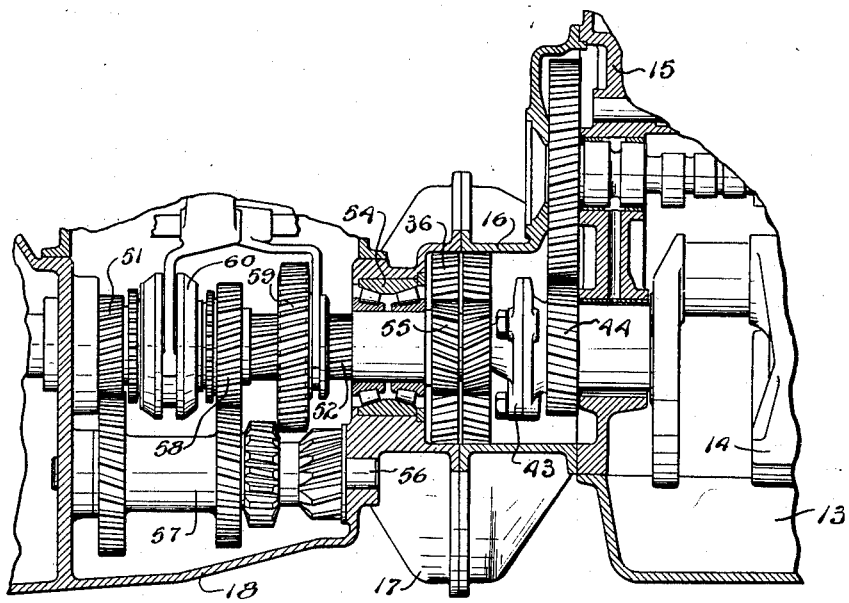
Figure 4 is a sectional view, taken on the line 4—4 of Figure 3.

Referring to Figure 3 of the drawings, I have shown a differential unit 24, which is rotatably mounted in the housings 16 and 17 by means of a pair of roller bearing assemblies 25 and 26, respectively. A spider 27 is secured in the center portion of the differential and a plurality of differential pinions 28 are rotatably mounted on the spider in the conventional manner. A pair of bevel differential gears is formed on the inner ends respectively of a pair of sleeves 29, each sleeve being rotatably mounted in one end of the differential 24. The sleeves are mounted so that the bevel gears are in mesh with the pinions 28. A plurality of internal spherical grooves 30 are machined in each sleeve 29 and form the driving halves of a pair of constant velocity type universal joints.

A pair of axle shafts 31 extend outwardly from each side of the differential 24, the inner end of each shaft being formed with an enlarged spherical portion 32 which is disposed within the adjacent sleeve 29. Each spherical portion 32 is provided with a plurality of external spherical grooves 33 and a driving ball 34 is disposed in each arcuate chamber formed by one of the grooves 33 and the adjacent groove 30. It will thus be seen that each sleeve 29 drives an axle shaft 31 through the universal joint formed by the balls 34 and grooves 30 and 33. Each axle shaft is thus free to oscillate around the center of its spherical head 32. An axle shaft housing 35 is mounted to oscillate around the center of each universal joint, with each shaft 31 extending outwardly through one of the housings 35. Driving wheels are, of course, secured to the outer ends of the axle shafts, as shown in the above mentioned patent.

An axle gear 36 is secured to the intermediate portion of the differential 34 and forms the drive for the two axle shafts 31. The gear 36 is offset longitudinally from the axis of the engine crank shaft 14 and, with a pinion later to be described, forms the gear reduction for driving the shafts 31 at a reduced speed from the motor.

It will be noted that a plate 37 is interposed between the outer end of the housing 19 and the cover 20, which plate has an inwardly extending sleeve 38 formed integrally therewith. A hub 39 is rotatably mounted within the sleeve 38 on a pair of axially spaced ball bearing assemblies 40. The hub 39 is formed integrally with a flywheel 41 which extends radially from the inner end of the hub. The sleeve 39 and flywheel 41 are thus rotatably supported within the housing 19.

It will be noted that the bore of the hub 39 is splined to receive the outer end of a crank shaft extension 42. The shaft 42 extends from the hub 39 inwardly where it is formed integrally with a flange 43 which is secured to a timing gear 44, the latter being secured to the crank shaft 14. Thus, the drive from the crank shaft is transmitted through the shaft 42 to the hub 39 and from there to the flywheel 41. It will be noted that there is sufficient length to the shaft 42 that any slight misalignment between the hub 39 and the crank shaft simply springs the shaft a slight amount. The inner end of the shaft will be permitted a limited lateral movement which would not be possible were the inner end of the shaft 42 rotatably mounted in the housing 17.

It can be noted from Figure 3 that a starting motor and generator armature 45 is fixed to the outer side of the flywheel 41 and that a stationary field winding 46 is fixed to the periphery of the sleeve 38 within the armature 45. The starting motor armature 45 is, of course, driven by the flywheel 41 at all times that the engine is operating. When it is desired to start the engine, rotation of the armature 45 by the starting motor winding cranks same directly. The electrical design of my improved starting and generating unit forms no part of this invention and, consequently, will not be further described.

A clutch sleeve 47 is rotatably mounted between the inner end of the housing 19 and the inner end of the hub 39 concentric with the shaft 42. A conventional clutch disc 48 is splined on the outer end of the sleeve 47 and extends radially where it coacts with the flywheel 41. A clutch pressure plate 49 is controlled by a conventional clutch throwout collar 50 to selectively engage or disengage the disc 48. The drive is transmitted from the flywheel 41 to the sleeve 47 through the clutch disc 48.

It will be noted that a gear 51 is machined on the inner end of the sleeve 47 which forms the driving gear of the transmission which is disposed within the housing 18. A transmission sleeve 52 is rotatably mounted in the gear 51 by means of roller bearings 53 while the inner end thereof is rotatably mounted in the housing 17 by means of a roller bearing assembly 54. The inner end of the sleeve 52 is formed integrally with a driving pinion 55 which is in mesh with the gear 36. A conventional jack shaft 56 is mounted in the transmission housing 18 in position parallel to the sleeve 52 and a cluster gear member 57 is rotatably mounted upon the shaft 56. The cluster gear member 57 forms a drive from the gear 51 to an intermediate speed gear 58 which is rotatably mounted upon the sleeve 52 and also to a low and reverse speed gear 59 which is splined to the periphery of the sleeve 52. A synchronizing collar 60 is adapted to selectively connect the sleeve 52 with the intermediate speed gear 58 or with the adjacent end of the driving sleeve 47 to effect either the intermediate speed gear drive or the direct drive from the sleeve 47 to the sleeve 52. The low and reverse speeds of the transmission are, of course, effected by axial shifting of the gear 59.

The foregoing described transmission is of the conventional sliding gear type. It will be noted, however, that considerable axial clearance is maintained along the entire length of the shaft 42 between the hub 39 and the crank shaft 14. This feature is very important in connection with this unit, as it permits the axial play between the crank shaft and the relatively fixed flywheel 4.

Among the many advantages arising from the use of my improved construction, it might be well to mention that I have provided a driving unit for vehicles wherein the engine and driving wheels are located at the rear of the car, which unit maintains a substantially equal distribution of weight on each side of the vehicle. Still further, the flywheel is assisted in its function by the armature 45 which adds to the weight of the unit at the opposite end from the motor 13. The positioning of the parts with a transmission and clutch interposed between the flywheel and the engine is believed to be unique and to be patentably different from all other assemblies known to the applicant.

Still a further advantage results from the use of this construction because each differential gear and adjacent universal joint half is formed as a single sleeve. This construction is particularly desirable because it permits the pivotal axes of the axle shafts to be disposed closer to the center of the car and thus produces a reduced angular shaft movement for a given vertical wheel travel.

Still further, the provision of a substantial clearance between the driving shaft and the driven sleeve of the transmission allows the crank shaft bearings to be taken up or any other axial offsetting of the engine crank shaft to a limited amount without causing binding between the driving shaft and the transmission.

Some changes may be made in the arrangement, construction and combination of the various parts of my improved device without departing from the spirit of my invention, and it is my intention to cover by my claims such changes as may reasonably be included in the scope thereof.

I claim as my invention:

1. A device of the character described comprising, a motor adapted to be mounted in a transverse position in a motor vehicle frame at one side of the center thereof, a transmission and differential housing fixedly secured to the inner end of said motor and adapted to be positioned in said vehicle frame at the center thereof, a flywheel rotatably mounted in axial alignment with said motor at the opposite side of said frame, a driving sleeve extending through said housing, a pinion fixedly secured on the inner end of said sleeve, a differential and driving gear unit fixedly secured in said differential housing in mesh with said pinion, an operable clutch disposed between said sleeve and said flywheel whereby a drive from said flywheel is transmitted through said clutch and said sleeve and pinion to said differential, and a driving shaft extending from the inner end of said motor through said sleeve and pinion, which shaft is fixedly connected to said flywheel.

2. A device of the character described comprising, a motor adapted to be mounted in a transverse position in a motor vehicle frame at one side of the center thereof, a transmission and differential housing fixedly secured to the inner end of said motor and adapted to be positioned in said vehicle frame at the center thereof, a flywheel rotatably mounted in axial alignment with said motor at the opposite side of said frame, a driving sleeve extending through said housing, a pinion fixedly secured on the inner end of said sleeve, a differential and driving gear unit fixedly secured in said differential housing in mesh with said pinion, an operable clutch disposed between said sleeve and said flywheel whereby a drive from said flywheel is transmitted through said clutch and said sleeve and pinion to said differential, and a driving shaft extending from the inner end of said motor through said sleeve and pinion, which shaft is fixedly connected to said flywheel, there being a substantial radial clearance between said driving shaft and said sleeve and pinion, for the purpose described.

3. A vehicle driving unit adapted to be mounted in a transverse position across a motor vehicle frame comprising, an internal combustion engine, a transmission and differential housing fixedly secured to one end of said engine, said housing being secured in the vehicle frame at the lateral center thereof, a differential unit rotatably mounted in said housing, said unit having a gear fixed thereto, the axes of said differential and gear being laterally offset from the axis of the engine crank shaft, a driving sleeve rotatably mounted in said housing in axial alignment with the crank shaft of said engine, the inner end of said sleeve having a pinion fixed thereto in mesh with said differential gear, a flywheel rotatably mounted at the outer end of said transmission in axial alignment with said transmission sleeve, an operable clutch interposed between said transmission and said flywheel, and a driving shaft extending through said transmission sleeve, which shaft connects said crank shaft and said flywheel, whereby the torque of said engine is conducted through said shaft to said flywheel, then back through said clutch and transmission sleeve to said driving pinion.

4. A vehicle driving unit adapted to be mounted in a transverse position across a motor vehicle frame comprising, an internal combustion engine, a differential and transmission housing fixedly secured to one end of said engine, a differential rotatably mounted in said housing at the center of the vehicle frame, said differential having a driving gear fixed thereto, the axes of said differential and gear being offset laterally from the axis of the engine crank shaft, a transmission sleeve extending through said housing in axial alignment with said crank shaft, said sleeve having a pinion fixed thereto in mesh with said differential gear, a combined flywheel and starter and generator housing positioned at the outer end of said transmission housing, a flywheel disposed in said last mentioned housing, a relatively heavy armature secured to said flywheel, a clutch interposed between said flywheel and said transmission sleeve, and a drive shaft extending from said engine crank shaft through said pinion and transmission sleeve, said shaft fixedly connecting said crank shaft and flywheel whereby a drive is transmitted from said engine to the flywheel and then through said clutch and transmission sleeve and pinion to said differential driving gear, there being substantial lateral clearance between said shaft and said transmission sleeve for the purpose described.

5. A vehicle driving unit comprising, a motor adapted to be mounted in a transverse position in the vehicle frame at one side of the longitudinal center therethrough, a differential housing fixed to the inner end of said motor, a sliding gear transmission fixed to said differential housing in position opposite said motor, a differential rotatably mounted in said differential housing with the axis thereof parallel to the crank shaft axis of said motor and spaced therefrom, a gear fixedly secured to said differential, a sleeve rotatably mounted in said transmission in position axially aligned with said crankshaft, said sleeve having a pinion fixed on its inner end in mesh with said differential gear, a flywheel housing formed at the outer end of said transmission, a relatively heavy armature and flywheel rotatably mounted in said flywheel housing in axial alignment with said transmission sleeve, a clutch interposed between said flywheel and said sleeve, a drive shaft extending from the inner end of the motor crank shaft through said pinion and transmission sleeve and connecting said armature and flywheel, whereby the drive from said motor is transmitted to said flywheel from which it is conveyed through said clutch and transmission sleeve and driving pinion to said differential, there being a substantial radial clearance between said drive shaft and the pinion and transmission sleeve, for the purpose described.

6. A driving unit adapted to be mounted in a transverse position across a motor vehicle frame comprising, an internal combustion engine positioned in said frame with one end of the crank shaft adjacent to the center of the frame and the other end adjacent to one of the frame side members, a differential and transmission housing secured to the inner end of said internal combustion engine, a differential and drive gear rotatably mounted in said housing, the axis of which is parallel to the axis of the engine crank shaft and which is spaced forwardly therefrom, a sleeve rotatably mounted in said housing in axial alignment with the crank shaft of said engine, said sleeve extending from the center of said frame towards the side opposite said motor, a combined starting motor and generator and clutch and flywheel unit rotatably mounted at the outer end of said transmission in axial alignment with said transmission sleeve, a pinion fixed to the inner end of said sleeve in mesh with said differential gear, and a drive shaft extending from the inner end of said engine crank shaft through said sleeve and pinion, which shaft is fixedly secured to said flywheel unit whereby said engine torque is transmitted by means of said shaft to said flywheel and from said flywheel through said clutch to said transmission sleeve and from said transmission sleeve through said pinion to said differential.

7. A driving unit adapted to be mounted in a transverse position across a motor vehicle frame comprising, an internal combustion engine, positioned in said frame with one end of the crank shaft adjacent to the center of the frame and the other end adjacent to one of the frame side members, a differential and transmission housing secured to the inner end of said internal combustion engine, a differential and drive gear rotatably mounted in said housing, the axis of which is parallel to the axis of the engine crank shaft and which is spaced forwardly therefrom, a sleeve rotatably mounted in said housing in axial alignment with the crank shaft of said engine, said sleeve extending from the center of said frame towards the side opposite said motor, a combined starting motor and generator and clutch and flywheel unit rotatably mounted at the outer end of said transmission in axial alignment with said transmission sleeve, a pinion fixed to the inner end of said sleeve in mesh with said differential gear, and a drive shaft extending from the inner end of said engine crank shaft through said sleeve and pinion, which shaft is fixedly secured to said flywheel unit whereby said engine torque is transmitted by means of said shaft to said flywheel and from said flywheel through said clutch to said transmission sleeve and from said transmission sleeve through said pinion to said differential, there being a substantial radial clearance between said transmission sleeve and pinion and said driving shaft, for the purpose described.

HENRY FORD.